S. P. RANDOLPH.

Cutter-Head.

No. 6,717. Reissued Oct. 26, 1875.

Attest:
Geo. H. Strong.
Jno L Bome.

Inventor:
Simon P. Randolph
by Dewey & Co
Attys

N. PETERS, PHOTO-LITHOGRAPHER, WASHINGTON, D. C.

UNITED STATES PATENT OFFICE.

SIMON P. RANDOLPH, OF TEHAMA, CALIFORNIA.

IMPROVEMENT IN CUTTER-HEADS.

Specification forming part of Letters Patent No. 165,868, dated July 20, 1875; reissue No. 6,717, dated October 26, 1875; application filed September 24, 1875.

*To all whom it may concern:*

Be it known that I, SIMON P. RANDOLPH, of Tehama, Tehama county, State of California, have invented an Improvement in Cutter-Heads; and I do hereby declare the following description and accompanying drawings are sufficient to enable any person skilled in the art or science to which it most nearly appertains to make and use my said invention or improvement without further invention or experiment.

My invention relates to certain improvements in the teeth or cutters which are formed upon, or secured to, the peripheries of saw-plates, and the cutter-heads, of gouging, planing, shaping, and matching machines; and it consists in certain modifications and changes in the construction and application of the teeth or cutters, whereby they are rendered more effective, and the necessity of resharpening them so often is avoided, as will be more fully shown and represented in the following description, in which reference is had to the accompanying drawings, in which—

Figure 1:
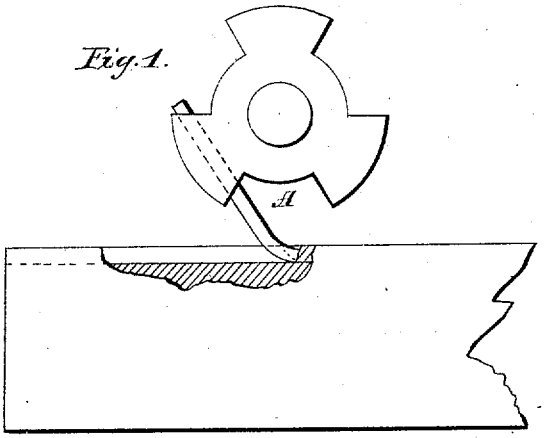
Figure 3:
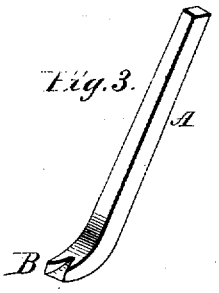
Figure 4:
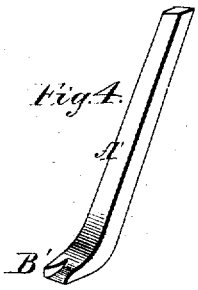
Figure 2:
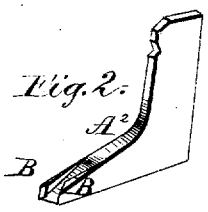

Figure 1 is a side view of a cutter-head with my matching cutter or knife. Fig. 2 shows the principle as applied to a saw-tooth. Figs. 3 and 4 are views of the cutter.

The tooth or cutter which I use I provide with a lip or side cutting-flange, B, either upon one or both sides of the cutting-point, according to the special use to which the tooth or cutter is to be applied. For instance, in saw-teeth, as at Fig. 2, and in cutters for tonguing or grooving, as at Figs. 1 and 4, I employ the lips or planing-flanges upon both sides of the cutting-point of the tooth or cutter; but when the cutter is used for rabbeting or cutting a side groove I use only one lip or flange, as at B, Fig. 4, and then I place it on the side that cuts the wood on the under portion of the groove.

I am aware that planing lips or flanges have heretofore been used on saw-teeth for the purpose of planing the sides of the saw-kerf at the same time that the teeth cuts the kerf; but these planing lips or flanges have been placed or formed back of the cutting-edge, and were usually formed by grooving the front edge of the tooth, and spreading the edges upon each side of the groove, thus providing planing bits or lips which stood at an angle to the cutting-edge proper of the tooth or cutter.

It will be noticed that my planing lips or flanges B form merely side extensions, and that their front or cutting points or edges are on the same plane with the cutting-edges of the teeth A. This feature, together with the manner of applying the teeth, renders my improvement extremely effective.

In applying my improved tooth or cutter to the saw-blade or cutter-head I either bend the end of the tooth or cutter as represented at Figs. 1, 3, 4, or file it rounding, so that the point of the tooth, and a short portion back of the point, will exactly coincide with a circle drawn from the center of the saw-blade or cutter-head. The cutting-edges of the planing lips or flanges B will then be radial, or nearly so, to the center of the circle thus formed. The point or cutting-edges of each tooth will then strike the wood squarely, with a planing or shaving stroke; and the cutting-points of the planing-lips will strike the wood simultaneously, and cut in the same manner, so that the cutting-edges will meet with no more friction than the cutting-point of a chisel; whereas, according to the method heretofore practiced, the teeth were secured to the plate or cutter-head at such an angle that their cutting-points acted upon the wood by scraping, thus not only creating unnecessary friction, which absorbed much power, but also wearing away the cutting-point, and necessitating the frequent sharpening of the cutter or teeth.

In practice, a set of saw-teeth applied as I have above described, will last for several days without sharpening. They will also make a narrower kerf, thereby saving a larger percentage of timber than the ordinary teeth; and the wear upon the tooth-point and edges of the planing-bits will be uniform, so that but little labor is required to resharpen the teeth or cutters when they become dulled.

For forming the tongues and grooves of matching-lumber the above-described cutters will be especially valuable, because the edges will not wear away so as to reduce the size of the groove, and increase the size of the tongue, materially; whereas the scraping-cutter is constantly being reduced in width by the wearing away, so that the grooves and tongues will not be of uniform size or width.

Having thus described my invention, what I desire to secure by Letters Patent is—

A saw-plate or cutter-head, provided with teeth or cutters A, $A^1$, or $A^2$, each of which has a planing lip or flange, B, formed on one or both sides of its cutting-edge, so that the edges of said planing lips or flanges are in the same plane with the cutting-edge of the tooth or cutter, substantially as and for the purpose described.

SIMON P. RANDOLPH.

Witnesses:

GEO. H. STRONG,

JNO. L. BOONE.